United States Patent
Troje et al.

[11] 3,822,936
[45] July 9, 1974

[54] OPTICAL SYSTEM FOR PANORAMIC PROJECTION

[76] Inventors: Gerald J. Troje, 1719 Centre St., Ridgewood, N.Y. 11227; Edward L. Schiavone, 10502 Insley St., Silver Spring, Md. 20902; Joseph A. Pinzone, 3829 Bushwick Ave., Brooklyn, N.Y. 11221

[22] Filed: Feb. 23, 1973

[21] Appl. No.: 335,166

[52] U.S. Cl. .................................. 353/99, 353/78
[51] Int. Cl. .................................. G03b 21/28
[58] Field of Search ............... 353/78, 77, 98, 99; 350/294; 352/69

[56] References Cited
UNITED STATES PATENTS

| | | |
|---|---|---|
| 585,770 | 7/1897 | Lugrin .................................. 350/264 |
| 1,551,259 | 8/1925 | Merriman .............................. 353/78 |
| 2,150,165 | 3/1939 | Holman ................................ 353/102 |
| 3,240,113 | 3/1966 | Stechemesser et al. ............... 353/99 |
| 3,504,964 | 4/1970 | Persidsky ............................. 352/69 |

Primary Examiner—Harry N. Haroian
Attorney, Agent, or Firm—I. J. Crickenberger

[57] ABSTRACT

An overhead projector is combined with a reflecting prism and an assembly of frusto-conical reflecting surfaces, each of which is individually adjustable with respect to the others, to produce panoramic motion picture images on a circular screen disposed peripherally about an audience.

3 Claims, 3 Drawing Figures

PATENTED JUL 9 1974　　　　　　　　　　　　　　　　　　　3,822,936

OPTICAL SYSTEM FOR PANORAMIC PROJECTION

BACKGROUND OF THE INVENTION

Motion pictures have long been a popular source of entertainment for the public. The visual effect of motion pictures is made possible by the property of persistence of vision of the human eye whereby the observer who sees a sequence of still pictures of an action receives the impression of seeing a continuous motion. Progress has been made from the early silent films with little or no camera techniques and subleties to the present day large screen productions with stereophonic sound and camera techniques that defy the imagination.

It has long been a desired objective to reproduce a filmed scene in panoramic vision in which the screen completely surrounds the observer in a circle allowing a 360° image with the observer in the middle. The peripheral vision of the human eye greatly influences the impressions formed, and observers of a panoramic picture who are located at or near the center of curvature of the screen experience a depth effect forcefully created in their minds. This effect is formed both from directly viewing the main action of the picture and from the indirect side views of scenery of lesser interest. The depth effect can be greatly enhanced by synchronization of the action portrayed with stereophonic sound which can be made clearly to convey the sensation of motion in conjunction with moving objects on the pictured scene.

Wide angle photography has been employed in the past with varying degrees of success. One such system has employed a plurality of projectors located near the center of curvature of the screen to project segments of a panorama onto a cylindrically curved screen. This arrangement has not been satisfactory because of the physical demands of space to accommodate the projection equipment at the very spot where the audience should be located. There has also been a problem of synchronizing the projector to eliminate the patchwork effect often encountered with multiple screen images.

SUMMARY OF THE INVENTION

With these problems in mind the present invention has for its principal object the provision of a means for producing a 360° image on a circular screen surrounding an audience. The optical system of the invention permits this arrangement to be realized with the use of overhead projectors which completely eliminate the presence of equipment with its attendant heat and noise in the area occupied by the audience.

The features of the invention are realized in a system of frusto-conical, optically-reflective surfaces arranged in adjustable relationship to enable a projector located above and out of the area of the audience to display a panoramic view on a 360° screen surrounding the audience.

DESCRIPTION OF THE INVENTION

Figure 1:
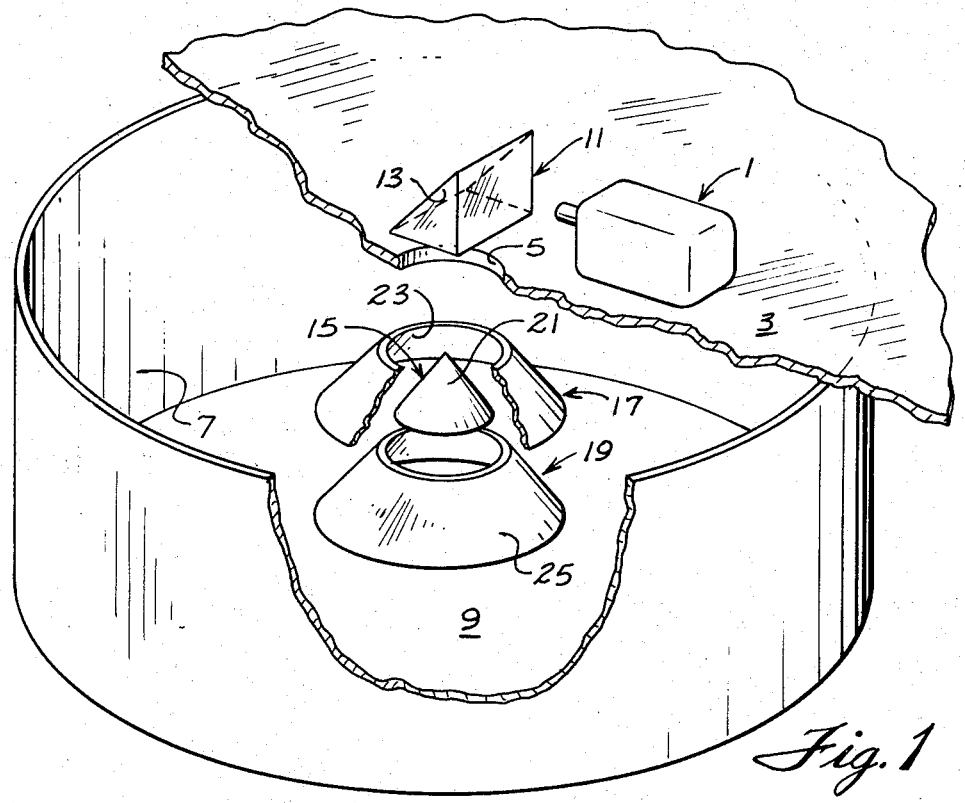
FIG. 1 is a partial perspective view of a system constructed in accordance with the invention showing the relative positioning of the optical elements with portions broken away to facilitate the view.

The invention will be understood more readily by referring to FIG. 1 which shows the system in perspective. It will be noted that FIG. 1 illustrates the system in exaggerated proportions in order to show clearly the components and their relative positioning.

In FIG. 1 a motion picture projector 1 is shown disposed above a ceiling 3 having a central aperture 5 located therein. A circular projection screen 7 with an interior reflective coating is located in the space below ceiling 3 and is positioned concentrically with aperture 5. The screen 7 is disposed about area 9 which is designed to contain seats (not shown) for a viewing audience.

An optical prism 11 is positioned in front of projector 1 and over aperture 5. Prism 11 has an interior optically reflective surface 13. Disposed beneath aperture 5 and in alignment with the central axis thereof are three frusto-conical elements 15, 17 and 19. Element 15 has an exterior optically reflective surface 21; element 17 has an interior optically reflective surface 23; and element 19 has an exterior optically reflective surface 25.

Projector 1 is designed to operate with film containing a series of annular images recorded by a specially constructed camera. The camera may typically utilize a frusto-conical reflector in front of the lens to reflect light from all objects in all directions within an appreciable vertical range to produce the annular image on the film.

Figures 2, 3:
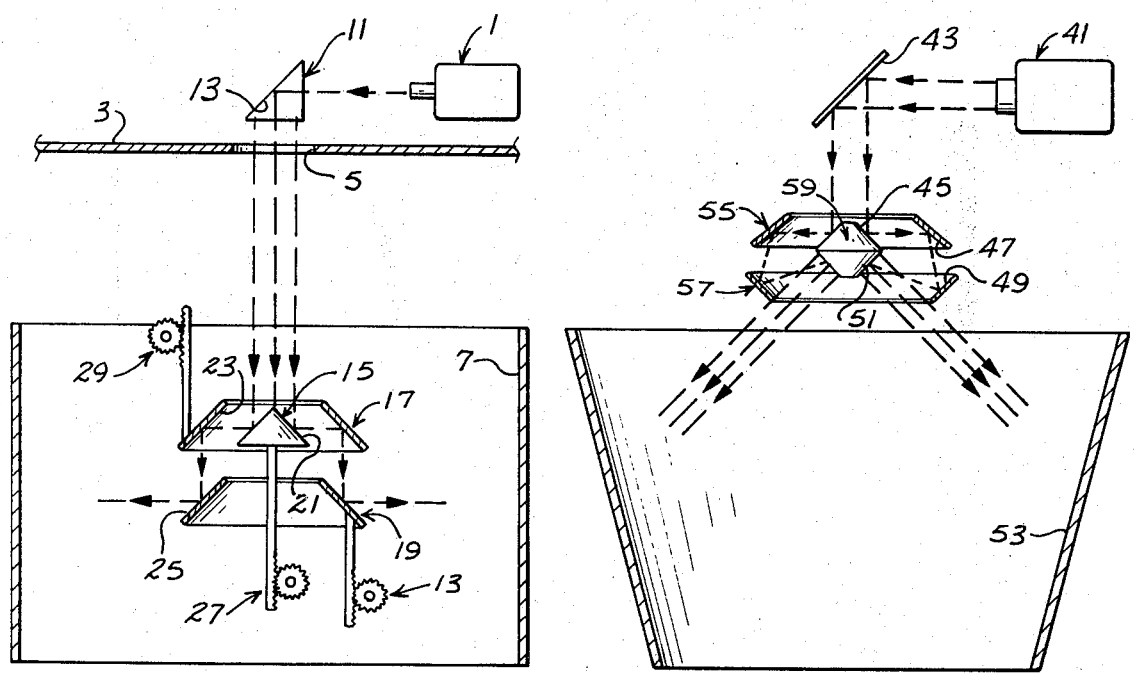
FIG. 2 is a diagrammatic showing of the system in FIG. 1 illustrating the reflective path for projection on the screen.
FIG. 3 is a diagrammatic view of a second embodiment of the invention.

FIG. 2 of the drawings illustrates the light ray paths from the projector 1. The annular image is projected onto and reflected from surface 13 of prism 11. The light rays pass through aperture 5 onto reflective surface 21 of element 15, where they are correspondingly reflected onto and from reflective surface 23 of element 17 and reflective surface 25 of element 19. The light rays are reflected from surface 25 onto screen 7 where a panoramic picture extending 360° about the audience is displayed. It will be appreciated that the sizes of elements 15, 17 and 19 have been greatly exaggerated with respect to screen 7, but this has been done for clarity of illustration in diagrammatic form.

Elements 15, 17 and 19 are concentrically positioned, and each element is provided with means for vertical adjustment. These means are shown generally in FIG. 2 at 27, 29 and 31, respectively, and may be any one of a number of conventional mechanisms suitable for the purpose. The showing of the adjustment means has been omitted in FIG. 1 to promote simplicity in understanding. In some installations it may be desirable to utilize less than 360° coverage of the screen, and in such instances the extent of the picture viewed can be varied to less than 360° coverage by blocking out a portion of the lens in projector 1. Similarly, it is feasible to use films for projection with coverage less than 360°. Such films may be produced with a camera in which a portion of the lens is blocked out.

FIG. 3 illustrates a second embodiment of the invention in which it is desirable to have the optical system located above the viewing screen. In this embodiment the projector 41 utilizes a reflecting surface 43 which reflects the light rays onto reflecting surface 45, and hence to reflecting surfaces 47, 49 and 51 in sequence. The rays are reflected from surface 51 onto screen 53 for panoramic viewing. Reflecting surfaces 47 and 49 are located on the interior of frusto-conical elements 55 and 57, respectively. Reflecting surfaces 45 and 51 are shown as upper and lower surfaces of element 59, but it is to be noted that surfaces 45 and 51 may be part of separate frusto-conical elements located in relatively adjustable positions instead of being part of a single element 59. The optical elements of FIG. 3 are provided with suitable mechanisms (not shown) for vertical adjustment and positioning similar to the means 27, 29 and 31 shown with respect to the system of FIG. 2.

It will be appreciated that the dimensions of the optically reflecting surfaces of the embodiments of FIGS. 2 and 3 will depend upon the size of the screen and the audience seating capacity. The design of the optical elements as to angles and dimensions is straightforward in the application of the principles of optics and forms no part of this invention.

The system of the present invention produces a panoramic image about a centrally disposed audience. The audience viewing is accomplished without the attendant noise and heat of the projecting apparatus which has been present in systems of the prior art. The relatively few parts of the optical system make it simple to produce and trouble-free in operation.

What is claimed is:

1. An optical system for projecting a panoramic image comprising
    an optically reflective screen extending through an arc of 360°,
    at least three frusto-conical elements each of which has an optically reflective surface
        at least one of said frusto-conical elements being hollow and having an interior surface which is optically reflective,
        means for mounting said frusto-conical elements in adjustable relationship with respect to each other, the axes of said elements being concentric with each other and with the central aixs of said screen, and
    means for projecting light ray images onto the optically reflective surfaces of said frusto-conical elements, said elements being positioned in such relationship as to produce a panoramic image on said screen.

2. The combination according to claim 1 wherein two of said frusto-conical elements are hollow and larger than a third element located between said two larger elements.

3. The combination according to claim 2 wherein said third element includes a plurality of frusto-conical reflecting surfaces.

* * * * *